United States Patent [19]

Mazur et al.

[11] Patent Number: 5,110,364
[45] Date of Patent: May 5, 1992

[54] PROCESSES FOR DECONTAMINATING POLLUTED SUBSTRATES

[75] Inventors: Duane J. Mazur, Amherst; Norman L. Weinberg, E. Amherst, both of N.Y.; Albert E. Abel, Columbus, Ohio

[73] Assignee: A.L. Sandpiper Corporation, Columbus, Ohio

[21] Appl. No.: 385,799

[22] Filed: Jul. 27, 1989

Related U.S. Application Data

[63] Continuation-in-part of Ser. No. 31,701, Mar. 30, 1987, Pat. No. 4,853,040.

[51] Int. Cl.$^5$ .......................... C07C 7/48; C02F 1/70
[52] U.S. Cl. ..................... 134/2; 208/262.5; 208/182; 208/179; 585/861; 210/757
[58] Field of Search ............... 208/262.5, 179, 182; 585/861; 134/12, 36, 42, 2; 210/757

[56] References Cited

U.S. PATENT DOCUMENTS

| | | | |
|---|---|---|---|
| 3,634,278 | 1/1972 | Wolverton | 252/192 |
| 4,377,471 | 3/1983 | Brown | 208/262 |
| 4,430,208 | 2/1984 | Pytlewski et al. | 208/262 |
| 4,468,297 | 8/1984 | Sawyer et al. | 204/59 R |
| 4,602,994 | 7/1986 | Pytlewski et al. | 208/262 |
| 4,632,742 | 12/1986 | Tundo | 204/158.21 |
| 4,639,309 | 1/1987 | Lalancette et al. | 208/262 |
| 4,675,464 | 6/1987 | Rogers et al. | 585/538 |

FOREIGN PATENT DOCUMENTS 59-10329  1/1984  Japan.

OTHER PUBLICATIONS

Freed, S. et al., J. Chem. Physics, vol. 7, 85–86, 1939.
Dewald, R. R. et al., J. Phys. Chem., 84, 3272 3273, 1980.
Dewald, R. R. et al., Chemical Communications, 647–648, 1967.
Wolthorn, H. J. et al., ACS, 1551, Jul. 1934.
Dryden, H. L. et al., vol. 26, 3237–3245, 1961.
Kennedy, M. V. et al., J. of Environmental Quality, vol. 1, No. 1, 63–65, 1972.
House, H. O., Modern Synthetic Reactions, W. A. Benjamin, Menlo Park, CA., 145–150 & 190–205, 1972.
Dewald, J. E. et al., J. ACS, vol. 76, 3369–3373, 1954.
Smith, M., Reduction, Augustine, R. L. ed., Marcel Dekker, N.Y., 95–126, 1968.
Watt, G. W., Chemical Review, vol. 46, 317–379, 1950.
Chemical Abstracts, vol. 31, 6135(1), Pleskov, V.A. 1937.
Su, W–F. A. IEEE Transactions on Power Apparatus and Systems 140–142, 1984.

*Primary Examiner*—Patrick P. Garvin
*Assistant Examiner*—G. Fourson
*Attorney, Agent, or Firm*—Howard M. Ellis

[57] ABSTRACT

Substrates polluted with toxic substances are treated in-situ with solvated electrons prepared chemically or electrochemically. The process is useful in treating porous and nonporous substrates, such as earth, clay, sand, soils, concrete, asphalt, wood, brick, block and other masonry surfaces, including liquids such dielectric fluids contaminated with halogenated hydrocarbons without the usual separation procedures to provide substrates suitable for recycle having <1 ppm pollutant remaining.

33 Claims, 1 Drawing Sheet

PROCESSES FOR DECONTAMINATING POLLUTED SUBSTRATES

CROSS REFERENCE TO RELATED APPLICATION

This application is a continuation-in-part of application Ser. No. 07/031,701, filed Mar. 30, 1987 now U.S. Pat. No. 4,853,040.

BACKGROUND OF THE INVENTION

The present invention relates generally to processes for controlling environmental pollution, and more specifically, to chemical means for decontaminating substrates polluted with toxic substances.

The great difficulty in controlling toxic environmental pollutants is implied in the sheer tonnage of the chemical industries production. Whereas 25 million gallons of benzene solvent were manufactured in 1940, by the 1980's, this figure exceeded 2 billion gallons per year in the United States alone. In the last twenty years the production of general organic solvents rose more than 900%, while during the same period the production of plastics increased by more than 2000%, and synthetic fibers, for example, more than doubled that figure.

Unfortunately, however, the technology for handling and disposing of toxic waste and chemical by-products has not kept pace with the enormous growth of industry and its requirements for chemicals. In response to this problem, a new industry, the hazardous waste disposal industry, developed. The new industry promised to neutralize or recycle wastes, but no innovative technology to meet the growing problem economically developed. As a result, waste handlers have been forced to resort to land disposal, which is a storage technology and not a disposal technology, and only postpones the problem of ultimate disposal. In some instances, the toxic chemicals have been carelessly discharged into the environment, e.g. onto grounds or into landfills having inappropriate subsoils, and the like. For example, waste oils contaminated with dioxin, transformer oils containing polychlorinated biphenyls (PCBs), and a wide variety of waste solvents have been discharged, causing contamination of water supplies and creating other potential health risks.

Attempts to respond to leaking tank cars, spills and other environmental events and to decontaminate polluted grounds and other surfaces exposed to toxic substances frequently are met with delays and/or inadequate corrective measures. Often, time is of the essence to minimize environmental impact. Yet, cleanup can mean a relatively slow and costly process, e.g. removing the polluted substrates, such as by reclamation where, for instance, contaminated earth is excavated and transferred to a different location. Other methods of treating environmental events have been classified as being either unreliable or not adequately spontaneous as to be amenable to on-site treatment of the exposed substrate. For example, U.S. Pat. No. 4,430,208 (Pytlewski et al) describes methods used by analytical laboratories for decomposing PCBs with sodium metal in liquid ammonia i.e. solvated electrons. The patentees describe various drawbacks associated with this method, namely difficulty in preparing, cost of shipping and lack of stability in storage. Other shortcomings mentioned include sensitivities to oxygen and to water which impede reliable use of solvated electrons under field conditions.

Pytlewski et al then disclose a process for treatment of dielectric fluids contaminated with PCBs which obviates the foregoing problems with solutions of sodium in liquid ammonia. Instead of solvated electrons, their process provides for the use of NaPEG for decomposing PCBs. However, before contaminated dielectric fluids, for example, can be treated they are first subjected to a multistage extraction process, initially with PEG and then with cyclohexane to separate the organic e.g. PCBs for subsequent decomposition with NaPEG.

Accordingly, one aspect of the present invention includes the discovery that solvated electrons prepared from solutions of sodium metal in liquid ammonia are especially effective in the treatment of various contaminated substrates including organic solvents, dielectric fluids, and the like, polluted with halogenated organics e.g. PCBs, without the need for prior separation of the pollutant from the substrate. The present invention allows the contaminated substrate to be spontaneously treated without costly separation procedures.

Numerous agricultural chemicals have been recently found to be potentially toxic or environmentally harmful. Agents such as pesticides, herbicides, fungicides and fertilizers which are applied to large areas of ground in tonnage quantities are now being examined and in some cases banned for future use because of their toxicity. Materials such as DDT, EDB, chlordane and chlordecone are now severely restricted. In high concentrations these materials pose a serious health threat as they leach into the aquifers. Inexpensive, efficacious means for removing these materials from the soil or destroying them in-situ do not presently exist.

Kennedy, M. V. et al, *Jour. Environ, Quality, Vol.* 1, no. 1, 63–65, 1972, disclose laboratory studies relating to the treatment of herbicides, insecticides, fungicides and nematocides with liquid ammonia and metallic sodium or lithium conducted under controlled laboratory conditions. While the laboratory results were generally favorable, the experimental studies of Kennedy et al were conducted with essentially pure analytical grade materials. That is, Kennedy et al did not conduct their studies under field conditions where chemicals have actually diffused into the ground where they have become dispersed with the organic and inorganic components of earth, or where the pollutants have undergone partial decomposition, or in the presence of water which may be also be present. In the treatment of such naturally occurring substrates one would expect competing reactions to occur with the solvated electrons so as to interfere with the selectivity of the solvated electrons modifying the pesticide to a substance of lesser toxicity. Water, oxygen, nitrogen; metals like iron, copper, nickel, manganese, cobalt, etc., all naturally occurring in soils and the environment readily react with and/or impede the stability of solvated electrons. The mere fact that ammonia solution boils at $-33°$ C., by itself, has also deterred serious consideration t the practical application of solvated electrons as a viable means for treatment of soil and other porous substrates contaminated with such organics. Hence, alternative technologies have developed. For example, U.S. Pat. No. 4,632,742 (Tundo) discloses soils and other porous surfaces, like cement and sandstone, as well as smooth surfaces like glass contaminated with polyhalogenated organics, like PCBs treated with decontaminating reaction mixtures of alkali, polyethylene glycol and a source of free radicals. In treating contaminated soils and other porous and nonporous substrates methods of Tundo provide for removing moisture and enhancing decontamination by heating the soil or other porous substrate by irradiating with microwaves or by implanting electrodes in the soil for dehumidification. While the processes of Tundo may result in the destruction of the pollutant the need for dehumidification detracts from spontaneity and practicality of the process particularly when large clean-up areas are involved. Surface water will usually evaporate, but subterranean moisture can remain in the soil indefinitely.

Thus, contrary to what had been previously regarded as generally unworkable the present invention also includes the surprising discovery that contaminated substrates including porous, high surface area, as well as low surface area essentially smooth, nonporous surfaces having relatively high moisture levels, and even in the case of water saturated porous substrates like earth, soil, clay, sand, stone and heterogeneous mixtures of the same having essentially mud-like consistencies can be effectively decontaminated with solvated electrons. Methods of the present invention are effective notwithstanding competing reactions prompted by the presence of oxygen, iron, copper, etc. This was indeed surprising in view of the substantial technical authority viewing water, for example, and various metals as antagonists of solvated electrons. Accordingly, because the process was found to be also operative in the presence of moisture/water, pretreatment steps normally employed for evaporation of moisture can be eliminated. This provides for a more spontaneous method of treatment at the situs of the event which reduces the potential for damage to the environment. An extension of this aspect of the invention includes treatment processes in which solvated electrons are used in the reclamation of bulk quantities of chemically contaminated soils and other porous, high surface area substrates like brick and concrete with materials which are economical and environmentally benign.

It has been pointed out, according to the present invention, naturally occurring porous surfaces like soils, clays, sand, stone, wood, etc., as well as man-made materials like concrete, asphalt (roadways), brick, including plastics, metallic substrates, etc., may become contaminated with organic compounds and other hazardous substances requiring prompt remedial in-situ or "batch" treatment. The latter method generally includes excavation and removal of contaminated soils, or recovery of articles of manufacture, such as hardware, tools and equipment like transformers and their cores, etc., which can be transferred to a reactor or other containment vessel and decontaminated by flushing with solutions of solvated electrons. The decontaminated soils, articles, materials and equipment, i.e. substrates, can thereby be reclaimed.

The expression—contaminated or polluted substrate—is intended generally to include any solid, liquid or gaseous naturally occurring or manufactured material, substance or article having a pollutant which may be entrained in, dissoved in, molecularly bonded or physically sorbed, i.e. adsorbed or absorbed thereto, rendering it potentially unsafe to a biological system. It has been observed, particularly in the case of porous substrates like concrete, asphalt, soils and clays, that decontaminants can become sorbed or bonded to the substrate making decontamination and reclamation slow and inefficient. Accordingly, as a further aspect of the invention it was found that substrates having contaminates sorbed or bonded thereto can be effectively treated with the reactant, ammonia, which is also used in solvating electrons for reduction and destruction of the contaminant. It was discovered that ammonia applied to or mixed with the substrate prior to destruction of the contaminant effectively desorbs or releases the pollutant, increasing the efficiency of solvated electrons in the decontamination process. Thus, the present invention embraces the discovery that ammonia and anhydrous liquid ammonia may be used in desorption and solvation of electrons respectively in the decontamination of substrates.

As previously indicated, problems associated with pollution control frequently involve treatment of a substrate which has become contaminated with a toxic substance. The substrate may be treated in-situ or removed and processed in a batch type method with solvated electrons in one or more process steps including, for instance, pretreatment with a heat generating desorbent e.g. ammonia. Such methods degrade the toxic substance and achieve reclamation of the substrate, e.g. soil. Frequently, however, in the chemical industry there are large volumes of toxic, potentially hazardous, unwanted, discontinued or off-spec materials which cannot be safely disposed of without harm to the environment. For example, there is evidence that chlorofluorocarbons (CFCs) like certain Freons ®, Halons ®, etc., used as refrigerants and propellants in aerosol containers are potentially harmful to the outer ozone layer which shields the earth from harmful UV light. Alternative frigerants and propellants are being developed while certain CFCs are being phased out. However, there are still sizeable reserves of chlorofluorocarbons on hand which must be treated and converted to environmentally benign substances. Accordingly, the present invention contemplates not only methods for the decontamination of polluted substrates, but also chemically degrading bulk volumes of unwanted potentially harmful substances like CFCs by dehalogenation. More specifically, in the case of CFCs, the invention contemplates treatment with solvated electrons for selective removal of at least one chlorine atom without defluorination to form modified CFCs of lesser toxicity which are environmentally benign and which still possess the desired utilities of CFCs. In other words, this aspect of the invention includes methods for converting hazardous substances to materials of reduced toxicity and impact on the environment or to materials which can be recovered as useful by-products.

SUMMARY OF THE INVENTION

Generally, the present invention relates to processes for treating toxic, hazardous, unwanted, discarded, discontinued or off-specification materials or substrates contaminated with these materials which in the process of treatment yields substance(s) and/or substrate(s) which are less toxic to a biological system or less hazardous to the environment. More specifically, the invention relates to processes for decontaminating, for example, substrates polluted with pesticides, insecticides, herbicides, various halogenated and nonhalogenated organic compounds; other chemicals and their waste by-products; potentially harmful biological materials, etc., which can be chemically reduced, degraded or otherwise modified to simpler substances of lesser toxicity, and even more preferably, to substances which are essentially nontoxic.

It is a principal object of the invention to provide a method for decontaminating a substrate polluted with a toxic substance by providing a solution of solvated electrons, and applying to the polluted substrate the solution in an amount sufficient to substantially decontaminate the substrate. The expression "substantially decontaminate" is intended to mean the substrate has been effectively treated so it can be recycled/returned to service for its intended purpose or disposed of without producing toxic effects to animal and plant life. Therefore, definitionally, the term "substrate" for purposes of this invention is also intended to include in addition to the toxic substance per se, at least one other substance which is capable, at least theoretically, of competing with the selectivity of the reaction between the toxic substance and solvated electrons or the formation and/or stability of the solvated electrons. This would include inter-alia water in a sufficient amount as to impede the formation and/or stability of the solvated electrons. The substrate itself may include high surface area porous or essentially nonporous materials. Typical porous materials may comprise earth/ground including soils, clays, sand, stone, and various mixtures of the same. Toxic substances may include organic compounds generally, and more specifically, aromatic and aliphatic organic compounds, particularly halogenated compounds.

Processes for decontamination can also include the steps of first forming a solution of the solvated electrons and contacting contaminated surfaces, for example, holding tanks or other chemical processing equipment having metallic, glass or other type of resistive surfaces with the solution in an amount sufficient to chemically reduce or otherwise detoxify the contaminated surfaces. This will have the effect of rendering the surfaces and processing equipment safe for further use. The process also includes forming solvated electrons in or on the substrate in-situ.

Solutions comprising solvated electrons may be prepared chemically by dissolving an alkali metal, like sodium or lithium in liquid ammonia or other suitable nitrogen-containing solvent. Alternatively, solvated electrons can be prepared electrochemically by electrolyzing an alkali metal salt in liquid ammonia or other stabilizing solvent. The electrolyte containing the solvated electrons can be applied, for instance, to the ground at the site of the chemical spill in-situ to spontaneously detoxify the zone of contamination by significantly lowering the amount of toxic substance at the site.

It is still a further object of the invention to provide a process for decontaminating a liquid polluted with a toxic substance by the steps of providing a first liquid comprising solvated electrons and a second liquid polluted with a toxic substance, mixing in a reaction zone the second liquid with a sufficient amount of the first liquid to reduce the toxic substance to a substance of lesser toxicity without chemically modifying the second liquid. The process is performed without prior separation of the toxic substance from the second liquid. Second liquids may include chemically stable, substantially inert carriers, e.g. transformer fluids, hydraulic fluids, solvents, etc., contaminated with a chemically reactive toxic substance. By mixing the second liquid in a reaction zone with a sufficient amount of the first liquid the solvated electrons chemically modify the toxic substance to a material of lesser toxicity without altering the original properties of the carrier. The treated carrier is recovered from the reaction zone substantially free of toxic substances making it available for reuse. Surprisingly, other substances in the carrier liquid which would potentially react with solvated electrons, affect the stability of the solvated electrons or otherwise shorten their half-life were found not to compete with their selectivity in reacting with the contaminant.

It is yet a further object of the invention to provide a method for decontaminating a substrate polluted with a toxic substance by the steps of:

a) contacting a water moistened contaminated substrate with a sufficient amount of ammonia gas to desorb the toxic substance from the substrate;

b) contacting the desorbed substrate of (a) with a solvating liquid, and c) forming solvated electrons by contacting the substrate of (b) with a metal selected from the group consisting of alkali metal and alkaline earth metal to chemically modify the toxic substance to a material of lesser toxicity.

It is still another object of the invention to provide a method for decontaminating a substrate contaminated with a toxic substance by the steps of:

a) contacting a porous substrate contaminated with a toxic substance with a mixture comprising a solvent suitable for solubilizing the toxic substance and a liquid ammonia, and b) contacting the substrate of (a) with solvated electrons to chemically modify the toxic substance to a material of lesser toxicity.

A further principal object of the invention comprises a method for decontaminating a porous substrate polluted with a toxic substance by the steps of:

a) contacting the porous substrate with a mixture of water and an organic solvent suitable for solubilizing the toxic substance;

b) contacting the substrate of step (a) with ammonia gas to generate heat in-situ;

c) contacting the substrate of step (b) with a liquid ammonia to elevate the toxic substance to the surface of the substrate, and d) applying solvated electrons to the substrate of step (c).

It is yet a further object of the invention to provide a process for dehalogenation of chlorofluorocarbon compounds by the steps of providing a solution comprising solvated electrons, and adding the solution of solvated electrons to the chlorofluorocarbons to at least dechlorinate the compounds.

These and other features and advantages will become more apparent from the detailed description of the invention below.

DESCRIPTION OF THE DRAWINGS

For a further understanding of the invention as well as its characterizing features, reference should first be made to the accompanying drawing, wherein.

DETAILED DESCRIPTION OF THE INVENTION

Processes of the present invention provide improved means for pollution control and prompt remedial action with the objective of lessening the potential for adverse affects on plant and animal life and the environment, particularly in consequence to toxic chemicals and biological materials. The processes of the present invention are especially noteworthy in their ability to effectively lower the concentration of contaminant to <100 ppm, and more preferably, to 1 ppm or less.

The methods disclosed herein are adaptable for treating substrates, especially solid substrates which includes porous high surface area substances like ground/earth having a natural porosity which allows contaminants to readily drain and penetrate into subsoil layers and strata; also contaminating sand, clay, stone, mixtures of the same, etc. This also includes solid, man-made porous surfaces, like concrete, asphalt, block, brick and other masonry substrates in which contaminants, moisture, etc., are able to penetrate, and in many instances become sorbed or bonded to the substrate making complete decontamination difficult to achieve. High surface area porous substrates like concrete, asphalt and soils ca be especially difficult to fully decontaminate i.e. <100 ppm, because of penetration problems and reaching internal surfaces, crevices, particles and folds with the decontaminating solutions and/or elevating the pollutant to the surface for treatment. Also included within the meaning of the term substrates are sludges, which is intended to encompass natural sludges, like river bottom silt; industrial sludges like water and sewage treatment plant sludges. Industrial sludges can comprise any number of possible materials including, but not limited to polyvinyl chloride, silicon carbide and carbon. Sludges may be treated and detoxified as dried particulate matter, like fly ash or as thickened, moistened material. In addition to the physical make-up of the substrate being treated, these same substrates also are frequently laden with moisture and ground water from rain and snow, and also comprise naturally occurring minerals like iron, copper, cobalt, to mention but a few. The heterogeneous composition of such substrates setup potentially competing reactions which can theoretically interfere with the decontamination process. Hence, the processes contemplated herein are not merely homogeneous reactions between a single toxic substance and solvated electrons, but involve treatment of materials having physical properties and complex heterogeneous compositional make-up with the potential, at least theoretically, for a multitude of side reactions competing with the targeted pollutant for reaction with the solvated electrons. This would include, for instance, moisture which can interfere with the stability of the solvated electrons.

In addition to processes for treating polluted soils, clays, sand, stone and mixtures of the same, the processes can also be employed in decontaminating metallic substrates, such as holding vessels, tanks and chemical processing equipment; motorized vehicles, buildings; including textiles, clothing, and the like which may become exposed to toxic chemicals and biologicals. In each instance, the toxic substance should be capable of reacting in the presence of solvated electrons to form by-products which either have a lower potential for producing toxic effects in a biological system or can be subsequently treated by more conventional means for their degradation. For example, organic compounds, and more particularly, polyhalogenated aromatic compounds like polychlorinated biphenyls (PCBs) can be chemically reduced by contacting polluted soils or roadways to form relatively nontoxic biphenyls in-situ.

Solvated electrons can be generated chemically by dissolving an alkali metal, such as sodium, potassium or lithium, or alkaline earth metals like calcium, magnesium, etc., in a nitrogen containing solvent, such as liquid ammonia or anhydrous liquid ammonia cooled to from about −33° C. to about −50° C. A bright blue color indicative of the solvated electron is immediately visible. The reaction may be shown as follows:

$$Li° + \text{Liquid } NH_3 \rightarrow Li^+ + i^-$$

In solvating, molecules of the solvent around the charged species provide stability so that lithium ions, for example, do not react with solvated electrons. It is believed that minerals like iron, copper cobalt, etc., catalyze the reaction of lithium ions with solvated electrons. This is but one example of a possible competing reaction. The liquid ammonia being a relatively nonreactive solvent is capable of solvating electrons giving them some useful life. The ammonia is preferably maintained at a temperature below its boiling point in order to slow down the undesirable reaction and prevent the formation of hydrogen as shown below:

$$Li° + \text{Liq. } NH_3 \rightarrow Li^+ + e^- \xrightarrow{LiNH} LiNH_2 + H_2$$

It should be understood, however, that solvated electrons can be formed at higher temperatures than −33° C. by maintaining the ammonia solution under positive pressure. The objective is to maintain the ammonia in a liquid phase. The treating solution should have solvated electrons in a concentration sufficient to decontaminate the substrate. Typically, this means an electron concentration of about 0.1 to about 2.0 molar. In each case, the amount of metal dissolved will be an amount which is needed to produce sufficient electrons to react, i.e. chemically reduce the contaminant. For example, in the case of PCBs, it will require 2 electrons to reduce each chlorine to chloride.

The expression "a liquid ammonia" for purposes of this invention is intended to mean anhydrous liquid ammonia and solutions of ammonia comprising minor amounts of water. In addition to liquid ammonia, other useful solvating solvents can be employed, such as primary amines, secondary amines, tertiary amines and mixtures of such amines; amides and ethers. Representative examples include alkyl amines, like methyl amine, ethyl amine, dimethyl amine, triethyl amine, n-propyl amine, t-octyl amine, isopropyl amine, ethylene diamine mopholine; tetrahydrofuran (THF), hexamethylphosphoramide; diethyl ether, ethylene glycol dimethyl ether and mixtures of the same and such others which would be apparent to those skilled in the art. Dissolving metal reductions in the laboratory have been described by H. O. House in "Modern Synthetic Reactions", second edition, W. A. Benjamin, Menlo Park, Calif., Chapter 3, pages 145-150, 190-205, 1972.

Solvated electrons may also be generated electrochemically in an electrolytic cell comprising an anode side and cathode side by electrolyzing an alkali metal salt, such as lithium bromide, sodium chloride, potassium bromide, etc., in liquid ammonia while maintaining the temperature from about −33° C. to −50° C. The electrolytic cell is equipped with a separator, such as a glass frit or porous PTFE materials. Catholyte comprising solvated electrons can be withdrawn and applied directly to the polluted substrate. The electrochemical generation of solvated electrons was described by R. A. Benkeser et al, J. Am. Chem. Soc., Vol. 86, 5272–5276 (1964).

Generally, processes described herein may be carried out by contacting polluted substrates, using methods like spraying, pouring or any other convenient means of applying solutions comprising the solvated electrons over, e.g. a PCB-contaminated surface, or when a contaminated liquid is involved the liquid can be added to a solution of the solvated electrons and vigorously stirred. The reaction is substantially instantaneous. The solvent for the solvated electrons is then separated, such as by evaporation.

One advantage of the processes disclosed herein lies in the discovery that the contaminant need not be separated from the substrate, e.g. dielectric fluid, in order to dispose of the toxic pollutant, e.g. halogenated aromatic hydrocarbon. Instead, the entire contaminated fluid can be treated as is with solvated electrons to reduce the level of contaminant to <100 ppm, and more preferably to <1 ppm. The treated fluid substrate can be recycled or further use in transformers. This is surprising because such fluids may contain various additives, such as clarifiers, antioxidants, etc. which in some cases would also be expected to become chemically modified when pollutants like PCBs ar reduced with solvated electrons. It is especially significant to have discovered the high degree of selectivity of solvated electrons in acting specifically on the unwanted pollutant. The presence of moisture in contaminated liquids would also be expected to lessen the stability and half-life of solvated electrons. Yet, it has been found unexpectedly that dielectric fluids and various organic solvents, such as alcohols, ethers, ketones, and the like, can be effectively decontaminated according to the methods described herein without prior dehumidification or separation of the pollutant from the solvent substrate, or new additives employed to bring dielectric fluid products up to specification. This provides an important economic advantage over other related processes.

The discovery that solutions of solvated electrons, especially those prepared from an alkali metal or alkaline earth metal and liquid ammonia, can be used in decontamination procedures in the presence of high moisture levels is particularly advantageous in remedying large outdoor spills of chemicals involving porous surfaces. Chemical spills; accumulation of herbicides, insecticides, etc., in soils are frequently difficult to treat because of the presence of ground water. In remedying such spills, response time is important to minimize damage to the environment. Heretofore, it has been the view that moisture, and particularly water interferes with the stability of solvated electrons. U.S. Pat. No. 4,632,742 (Tundo), although not using solvated electrons per se provides for dehumidification of soils through irradiation and other means. U.S. Pat. No. 4,430,208 (Pytlewski et al) identifies the sensitivities to oxygen and water as impeding reliable use of solvated electrons under field conditions. However, contrary to the findings of Pytlewski et al, it has been found that even large quantities of moisture/water in the substrate, including amounts sufficient to saturate the ground to form mud-like slurries can still be effectively treated with solutions of solvated electrons, thus making the invention effective for use under field conditions.

As previously indicated, the expression —contaminated substrate—includes any naturally occurring or manufactured material, substance or article, solid, liquid or gaseous, having a pollutant which may be molecularly bonded or sorbed thereto. This also includes at least one other substance in addition to the unwanted pollutant which would ordinarily be expected to compete with the selectivity of the solvated electrons acting on the targeted toxic material or stability/formation of solvated electrons. Soils, clays, concrete, asphalts, masonry and wood are all capable of sorbing or bonding contaminants. Under such circumstances, chemical decontamination with solvated electrons may be incomplete unless the substrate is first treated so as to desorb the pollutant. Mere contact of the substrate, e.g. contaminated soil with solvated electrons may be insufficient to achieve very low levels of pollutant, i.e. <1 ppm. Accordingly, it has been found that desorption of chemical pollutants is endothermic requiring the addition of energy to the substrate in the form of heat. As an in-situ process ammonia (gas) delivered to the substrate e.g. soil, will in the desorption process combine with moisture in the soil to bring about release of the pollutant. That is, the ammonia in mixing with water or moisture in the soil generates heat in the process of forming ammonium hydroxide. Halogenated organics, e.g. PCBs, tend to dissolve in the solution or at least can be washed off to become entrained in the ammonium hydroxide instead of reabsorbing into the soil. In the event the substrate is substantially free of moisture, water may added before treatment with the ammonia. The in-situ heated soil is then treated with liquid ammonia (anhydrous) to form a slurry of soil particles. Alkali or alkaline earth metal, e.g. lithium, sodium or calcium, are added to the slurry comprising the desorbed pollutant which is readily reduced in the process.

It has also been discovered in the process of decontaminating polluted substrates, e.g. porous concrete, asphalt surfaces, that solvated electrons in liquid ammonia tend to react with only the surface of the contaminant. In so doing an "insulative" coating of the reduction product, e.g. biphenyl in the case of PCBs, appears to form on the surface of the pollutant. Consequently, additional destruction of pollutant is unable to readily take place or incomplete destruction of the pollutant occurs. As a further embodiment of the invention the substrate may be pretreated with a mixture of an inert organic solvent and liquid ammonia. Suitable organic solvents include low boiling, nonreducible solvents like methyl and ethyl alcohols, ethers and other nonaromatic hydrocarbon solvents. THF and hexane may also be employed. The boiling action of the liquid ammonia penetrates the pollutant whereas the organic solvent solubilizes the pollutant allowing the cold ammonia which begins to boil at above $-33°$ C. to raise the pollutant to the surface of the substrate. The surface is then treated with solvated electrons to reduce or otherwise destroy the pollutant for more complete decontamination. In the application of solvents alone, e.g. hexane, to a porous substrate, such as concrete, asphalt, etc., or in combination with a surfactant it has been observed that this tends to drive the pollutant further into the pores of the substrate. Repeated applications appear to solubilize the pollutant without bringing the pollutant to the surface. Accordingly, the combination of liquid ammonia and organic solvent is effective in overcoming this problem.

As an alternative embodiment of the invention, it has been found that appropriate organic solvent for the pollutant, such as THF for PCBs, with water, generally 50:50 mixture is also useful as a pretreatment for contaminated porous substrates, e.g. concrete, asphalt. The subsequent addition of liquid ammonia generates heat in reacting with the water applied to the substrate with the organic solvent mixture. This overcomes the effect of cold liquid ammonia which may chill pollutants, such as PCBs and form a waxy-like material which in-turn can make elevation of the pollutant to the surface of the substrate more difficult. The surface of the substrate can then be flooded with liquid ammonia to help raise the heated PCBs to the surface, and treated with solvated electrons.

In addition to the treatment of substrates with solutions of solvated electrons by the direct in-situ application to soils and other polluted porous and nonporous surfaces, as pointed out above liquids which became polluted with toxic and other unwanted substances can also be decontaminated by treating with solvated electrons. For instance, transformer oils and other similar inert liquids which may become contaminated with polyhalogenated aromatic compounds can be decontaminated by means of solvated electrons causing the destruction of this pollutant, usually to levels of less than 1 ppm, as required by government environmental regulations. Because the solvated electrons chemically reduce on a selective basis only the pollutant, e.g. PCBs, the carrier liquid, e.g. transformer oil can be recovered and recycled for further use.

One aspect of the invention thus contemplates embodiments where, for instance, inert liquids like hydrocarbon oils including transformer liquids, hydraulic fluids, other solvents and organic liquids like glycerine, THF, silicone based oils and other relatively nonreactive materials which have become polluted can be treated by blending with solutions of solvated electrons and allowing the liquid ammonia to evaporate. The inert liquid ca be recycled. This aspect of the invention can be practiced by vigorously stirring solutions comprising solvated electrons prepared either chemically or electrochemically. In addition, polluted inert liquids can be introduced into the catholyte compartment of a divided electrolytic cell wherein the solvated electrons generated at the cathode operate to chemically reduce the pollutant. The inert liquid can then be recovered.

Figure 1:
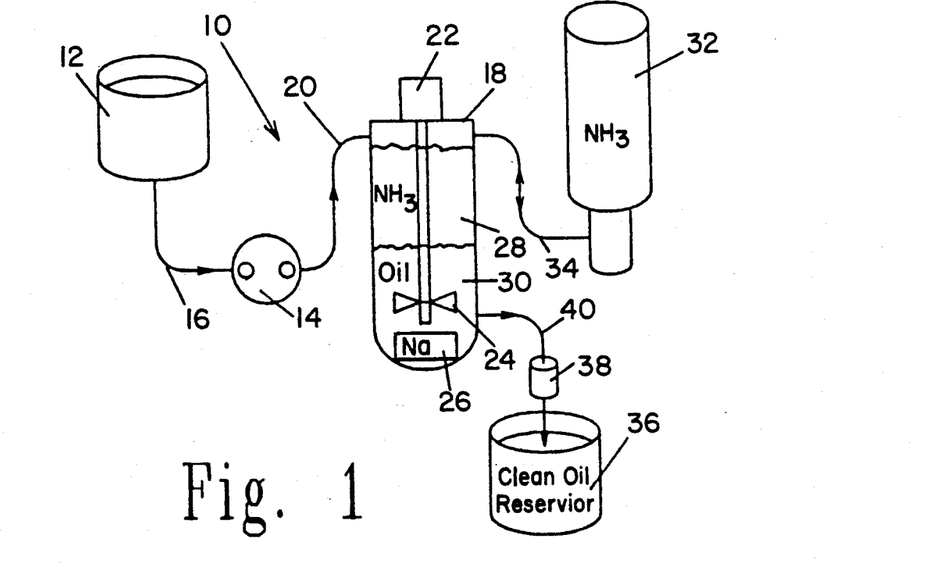
FIG. 1 is a diagrammatic view of one embodiment of the process employing solvated electrons to detoxify an inert, nonreducible liquid contaminated with a chemically reducible toxic substance.

Methods of the present invention can be demonstrated by reference to the drawing. FIG. 1 teaches a decontamination system 10 for treating chemically inert carriers polluted #with chemically reactive toxic substances. Mineral or other paraffin oils contaminated with, e.g. PCBs, are collected in reservoir 12 and treated in pressurized vessel 18. However, before introducing the contaminated liquid into vessel 18 solvated electrons are first chemically generated in the vessel by charging with liquid ammonia from cylinder 32 at a somewhat elevated temperature, sufficient to dissolve sodium metal 26 and form a 1 to 2 molar solution of electrons. Motor 22 driving reactor stirrer 24 is actuated to disturb the protective oil layer on the sodium metal allowing the metal to dissolve in the ammonia and solvate the electrons. Pump 14 then transfers contaminated oil from reservoir 12 to reactor vessel 18 through transfer lines 16 and 20. Oil temperature adjusting means of standard design (not shown) in line 20 in front of vessel 18 may be employed. The reaction mixture comprising the polluted oil and solvated electrons is stirred while allowing the temperature of the reaction mixture to rise above the boiling point of the solvent therein. Stirring is terminated and the mixture allowed to separate into an upper ammonia layer 28 and a lower oil layer 30. Ammonia 28 is bled off the reactor through line 34 to cylinder 32. Decontaminated oil 30 is drawn off through line 40, treated in in-line filter 38, and held for recycling in reservoir 36.

Figure 2:
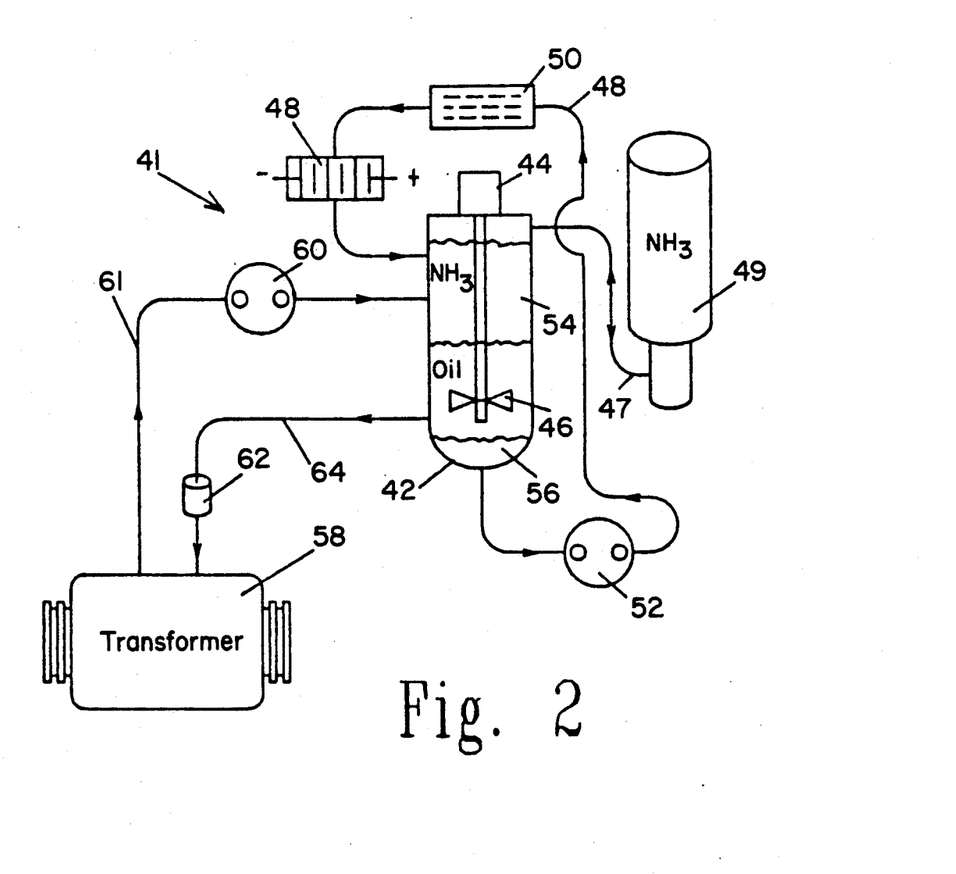
FIG. 2 is a diagrammatic view of an alternative embodiment of the process of employing solvated electrons generated electrochemically to detoxify a chemically inert liquid contaminated with a toxic substance.

FIG. 2 discloses a further embodiment of the invention for in-line decontamination of PCB transformer oil, which like that of FIG. 1, not only decontaminates the carrier oil, but simultaneously destroys the toxic PCBs by chemical reduction using solvated electrons. Decontamination system 40 comprises a pressurized reactor vessel 42 equipped with a stirrer 46 driven by motor 44. Reactor vessel 42 is a component of ammonia loop 48, which includes liquid ammonia cylinder 49 connected to vessel 42 by line 47 providing makeup ammonia to the loop. Pump 60 draws oil from transformer 58 to vessel 42 through direct oil outlet line 61. A solution comprising solvated electrons is formed outside the reactor vessel. In this regard, pump 52 bleeding ammonia from vessel 42 circulates the ammonia to chiller 50. The reliquified ammonia containing dissolved alkali metal salt, e.g. lithium bromide, is electrolyzed in a divided electrochemical cell 48. The catholyte containing solvated electrons is fed to reactor 42 where it is mixed with incoming transformer oil. The temperature of the reaction mixture is allowed to rise during mixing. Stirring is terminated and the mixture allowed to separate into a lower oil layer 56 and upper ammonia layer 54. Residual ammonia then returns to cylinder 49. The decontaminated oil is returned directly to the transformer from system 40 through oil inlet 64 after being treated in filter 62.

The following specific examples demonstrate various aspects of the invention, however, it is to be understood that these examples are for illustrative purposes only and do not purport to be wholly definitive a to conditions and scope.

EXAMPLE I

A 0.3 Molar solution of solvated electrons was prepared in a round bottom flask held in a cold bath of dry ice and acetone by stirring 0.35 grams of sodium in 50 ml of liquid ammonia at a temperature of $-45°$ C. The sodium metal quickly dissolved forming a characteristic blue solution. Twenty-five ml of transformer oil contaminated with 724 ppm of PCB's was then added to the 50 ml solution of solvated electrons in the liquid ammonia ($-45°$ C.) with vigorous stirring. The flask was then removed from the bath and allowed to gradually warm to room temperature over a two hour period, during which time the ammonia evaporated. The transformer oil in the flask was then analyzed by gas chromatography and found to have only 3 ppm PCBs present.

EXAMPLE II

In order to determine if chemical reduction was taking place at low temperatures, a 0.30 Molar solution of solvated electrons was prepared by stirring 0.175 grams of sodium in 25 ml of liquid ammonia ($-45°$ C.) in a flask held in a cold bath of dry ice and acetone. Twenty-five ml of transformer oil contaminated with 724 ppm of PCBs was added to the cold solution of solvated electrons with vigorous stirring. Stirring continued for 30 minutes while maintaining the solution at $-20°$ C. A sample of the contaminated oil was removed for analysis and found to have 364 ppm of PCBs present indicating that chemical reduction was occurring even at low temperatures.

EXAMPLE III

A sample of soil was contaminated with 273 ppm PCBs. In order to decontaminate the soil a 0.3 Molar solution of solvated electrons was prepared by dissolving 0.175 grams of sodium in 25 ml of liquid ammonia ($-50°$ C). The 25 ml of the 0.3 Molar solution at $-50°$ C. was added to a 5.0 gram sample of the contaminated soil at room temperature. The ammonia evaporated instantly before penetration of the soil was complete, but analysis showed that the PCB concentration in the soil had still been reduced to 195 ppm.

EXAMPLE IV

A 500 ml volume glass laboratory electrolytic cell with a porous glass frit was set-up with a vitreous carbon cathode in the cathode compartment and a graphite anode in the anode compartment. The cell was held in a dry ice and acetone bath. The compartments were filled with 250 ml of liquid ammonia ($-33°$ C.) having 10 grams of lithium bromide dissolved therein. Electrolysis was initiated, and 0.025 grams of the PCBs dissolved in 10 ml of cyclohexane was added to the catholyte. Electrolysis continued until 1,225 Coulombs of charge was passed at 0.4 amperes. The ammonia was then allowed to evaporate. The resulting solution was analyzed. 85% of the PCBs had been chemically reduced.

EXAMPLE V

A 50 ml solution of solvated electron in liquid ammonia was generated by dissolving 0.35 grams sodium metal with ammonia in a 250 ml round bottom flask cooled to $-50°$ C. The solution was poured over a 30 gram sample of sand (White Quartz, 50-70 mesh) having a PCB level of 236 ppm. The ammonia was allowed to evaporate over a 2 hour period.

EXAMPLE VI

A 50 ml solution of solvated electron in liquid ammonia (0.3 Molar) was generated by dissolving 0.035 grams of sodium metal in liquid ammonia in a 250 ml round bottom flask cooled to $-50°$ C. A 5 ml sample of tetrahydrofuran (THF) solvent contaminated with 1,450 ppm PCBs was added to the solvated electron solution, with stirring. The solution was allowed to warm to room temperature over a 2 hour period, after which the ammonia evaporated. The PCB level was reduced to 1 ppm.

EXAMPLE VII 100 grams of soil doped with 326 ppm PCBs was added to a three necked flask equipped with a reflux condenser and a stirring mechanism. Four samples were prepared and water added. Sample #1 had 0.5 grams water; Sample #2 had 2.0 grams water; Sample #3 had 4.0 grams water and Sample #4 had 20.0 grams water. 500 ml anhydrous liquid ammonia was added to the premoistened soil samples and stirred for 10 minutes. One gram of sodium metal was added to each sample and mixed for 10 minutes. The ammonia was allowed to boil off. The samples were analyzed for PCB residuals with the following results: Sample #1-4 ppm; Sample #2-11 ppm; Sample #3-38 ppm; Sample #4-46 ppm.

EXAMPLE VIII

Following the procedure of Example VII, five (5) samples of soil were prepared each with 326 ppm PCBs added and with the following moisture levels: Sample #1-20 grams water, Samples #2-26 were increased by 5.0 gram increments to 25, 30, 35, 40 and 45 grams, respectively. As a control, water was omitted from a soil sample. Each of the samples was treated with 3 grams sodium metal. Anhydrous liquid ammonia was the solvating solvent. The soil samples were analyzed for residual PCBs with the following results: Sample #1-62 ppm; Sample #2-26 ppm; Sample #3-87 ppm; Sample #4-63 ppm; Sample #6-67 ppm; control—31 ppm.

EXAMPLE IX

Following the procedure of Example VII, four soil samples were prepared each with 326 ppm PCBs. The objective was to determine what effect iron had on the performance of solvated electrons in the decontamination of soil. The Table below provides the results of the experiment:

TABLE

| Grams Fe Added* | ppm residual PCBs 1 Gm sodium | ppm residual PCBs 2 Gm sodium | ppm residual PCBs 3 Gm sodium |
|---|---|---|---|
| 0.0 | 61 | 53 | 33 |
| 0.5 | 62 | 70 | 41 |
| 2.0 | 63 | 85 | 63 |
| 5.0 | 93 | 63 | 82 |

*Naturally occurring iron already in soil

EXAMPLE X

Twelve concrete plates 1 ft. ×1 ft. were doped with PCB-containing hexane in order to measure the effectiveness of solvated electrons in surface decontamination. A swab test of PCB content was made before treatment began. The test plates were pretreated for 15 minutes with a solution of 20% THF and 80% anhydrous liquid ammonia. The face of the surfaces was kept moist with the pretreatment solution. After 15 minutes, a 0.3 Molar solution of sodium in liquid ammonia was added to the plates followed by vigorous brushing of the surfaces. The solution was maintained on the plates for the times shown in the table below:

TABLE

| Sample | Solvation Time (Min) | Pretreatment Test Mcg PCB/100 $cm^2$ | Post treatment Test Mcg PCB/100 $cm^2$ |
|---|---|---|---|
| 1 | 5 | 110 | 26.0 |
| 2 | 5 | 132 | 1.0 |
| 3 | 5 | 30 | 7.0 |
| 4 | 10 | 194 | 16.0 |
| 5 | 10 | 292 | 1.0 |
| 6 | 10 | 70 | <1.0 |
| 7 | 15 | 135 | 15.0 |
| 8 | 15 | 184 | <1.0 |
| 9 | 15 | 200 | 4.5 |
| 10 | 20 | 240 | 31.0 |
| 11 | 20 | 180 | 5.0 |
| 12 | 20 | 96 | 0.0 |

Similar plates without pretreatment averaged greater than 50 mcg PCBs/100 $cm^2$.

EXAMPLE XI

Four concrete plates having PCBs were tested by the following methods: Sample #1 having 685 mcg PCBs/100 cm$^2$ was treated for 15 minutes by scrubbing with a 0.3 Molar solution of sodium metal in liquid ammonia without any pretreatment. Post treatment PCB level was 105 mcg.

Sample #2 having 830 mcg PCBs/100 cm$^2$ was pretreated for 10 minutes with a solution containing 20% THF and 80% anhydrous liquid ammonia. The sample was then treated by scrubbing with a 0.3 molar solution of sodium metal in anhydrous liquid ammonia for 15 minutes to provide a final PCB level of 48 mcg/100 cm$^2$.

Sample #3 plate containing 719 mcg PCBs/100 cm$^2$ of surface was pretreated with a light surface coating of water which was allowed to stand for 10 minutes. Ammonia gas was introduced and maintained in contact with the sample under a tent for 15 minutes. The surface was then treated for 15 minutes with a 0.3 Molar solution of sodium metal in anhydrous liquid ammonia. The PCB residual was 69 mcg/100 cm$^2$ of surface area.

Sample plate #4 containing 918 mcg PCBs/100 cm$^2$ of surface area was pretreated for 10 minutes with a light coating of a 50:50 solution of water and THF. Ammonia gas was introduced and maintained in the enclosure for 15 minutes. Following the pretreatment, the surface was treated by scrubbing for 15 minutes with a solution of 0.3 Molar sodium metal in liquid ammonia. The residual PCBs were 19 mcg.

EXAMPLE XII

Three 100 gram samples of sandy soil taken from a superfund site containing 260 ppm PCBs were tested under the following conditions:

Sample #1 was placed as received (approx. 21 weight percent water) in a three necked flask complete with a reflux condenser and stirring mechanism. Ammonia gas was passed through the flask causing the moisture in the soil to react and generate heat. After about 10 minutes, the soil was observed to be very hot. Anhydrous liquid ammonia was then introduced first as a condensate from the reflux condenser and later as a cold liquid from the ammonia storage tank until 400 ml anhydrous liquid ammonia had been added to the flask. The soil and ammonia were mixed for 10 minutes and 6 grams of sodium metal was added to the mixture and stirred for an additional 10 minutes. Subsequently, the ammonia was allowed to boil off. The residual PCB content was measured at 11 ppm.

Sample #2 was treated the same as Sample #1, except ammonia gas was not employed as a pretreatment. The residual PCB level was 46 ppm.

Sample #3 consisting of 100 grams of dry soil was treated with anhydrous liquid ammonia and sodium metal without any pretreatment. The residual PCB level was 16 ppm.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

We claim:

1. A process for decontaminating a substrate polluted with a toxic substance, which comprises the steps of providing a solution comprising solvated electrons, and applying to said polluted substrate the solution in an amount sufficient to substantially decontaminate the substrate, said decontamination process being conducted in the presence of at least one substrate capable of competing with the selectivity of the reaction between the toxic substance and solvated electrons or stability of the solvated electrons.

2. The process of claim 1 wherein said polluted substrate is porous.

3. The process of claim 2 wherein said polluted porous substrate is a substance selected from the group consisting of soil, clay, sand, stone and mixtures thereof.

4. The process of claim 2 wherein the polluted porous substrate is a member selected from the group consisting of concrete, asphalt, wood and textile.

5. The process of claim 2 wherein the substrate is polluted with an organic compound a the solvated electrons are formed chemically by dissolving a metal selected from the group consisting of alkali metals and alkaline earth metals in liquid ammonia.

6. The process of claim 5 wherein the polluted substrate includes a member selected from the group consisting of water, oxygen, carbon dioxide, iron and mixtures thereof.

7. The process of claim 6 wherein the organic compound is a halogenated aromatic compound.

8. The process of claim 7 wherein the halogenated aromatic compound comprises polychlorinated biphenyls.

9. The process of claim 2 wherein said polluted porous substrate is brick.

10. The process of claim 2 wherein said polluted porous substrate is block.

11. The process of claim 1 wherein the polluted substrate is a contaminated sludge.

12. The process of claim 1 wherein the substrate is treated in-situ.

13. The process of claim 1 wherein the substrate is treated by a batch method.

14. A process for decontaminating a liquid polluted with a toxic substrate, which comprises the steps of providing a first liquid comprising solvent electrons, providing a second liquid with the toxic substance, mixing in a reaction zone said second liquid with a sufficient amount of said first liquid to reduce the toxic substance to a substance of lesser toxicity without chemically modifying said second liquid, said process being conducted without prior separation of the toxic substance from said second liquid and in the presence of at least one substance capable of competing with the selectively of the reaction between the toxic substance and solvated electrons or stability of the solvated electrons.

15. The process of claim 14 wherein the second liquid is a dielectric fluid or a hydraulic fluid.

16. The process of claim 14 wherein the toxic substance in the second liquid is a halogenated organic compound.

17. The process of claim 16 wherein the halogenated organic compound is a polychlorinated biphenyl.

18. The process of claim 14 wherein the second liquid is an organic solvent.

19. A process for decontaminating a substrate polluted with a toxic substance which comprises the steps of:

a) contacting a water moistened contaminated substrate with a sufficient amount of ammonia gas to desorb the toxic substance from said substrate;

b) contacting the substrate of (a) with a liquid ammonia and c) forming solvated electrons by contacting the substrate of (b) with a metal selected from the group consisting of alkali metals and alkaline earth metals to chemically modify the toxic substance to a material of lesser toxicity.

20. The process of claim 19 wherein the substrate is selected from the group consisting, soil, sand, clay, stone and mixtures thereof.

21. The process of claim 19 wherein the substrate is selected from the group consisting of concrete, asphalt, wood and textile.

22. The process of claim 19 wherein the solvated electrons are formed by contacting the substrate with a metal selected from the group consisting of sodium, potassium, lithium and calcium.

23. The process of claim 19 wherein said substrate is brick.

24. The process of claim 19 wherein said substrate is block.

25. A process for decontaminating a substrate polluted with a toxic substance which comprises the steps of:
   a) contacting a porous substrate contaminated with a toxic substance with a mixture comprising a solvent suitable for solubilizing the toxic substance and a liquid ammonia, and
   b) contacting the substrate of (a) with solvated electrons to chemically modify the toxic substance to a material of lesser toxicity, said decontamination process being conducted in the presence of at least one substance capable of competing with the selectivity of the reaction between the toxic substance and solvated electrons or stability of the solvated electrons.

26. The process of claim 25 wherein the solvated electrons are formed in-situ by contacting the substrate of step (b) with a metal selected from the group consisting of alkali metal and alkaline earth metal.

27. The process of claim 26 wherein the solubilizing solvent is an organic solvent.

28. The process of claim 27 wherein the organic solvent is a member selected from the group consisting of tetrahydrofuran and 1,2 dimethoxyethane.

29. The process of claim 27 wherein the porous substrate is a member selected from the group consisting of asphalt and masonry, and the toxic substance is a polychlorinated biphenyl.

30. A process for decontaminating a porous substrate polluted with a toxic substance which comprises the steps of:
   a) contacting said porous substrate with a mixture comprising water and an organic solvent suitable for solubilizing the toxic substance;
   b) contacting the substrate of step (a) with ammonia gas to generate heat in-situ,
   c) contacting the substrate of step (b) with anhydrous liquid ammonia to elevate the toxic substance to the surface of the substrate, and
   d) applying solvated electrons to the substrate of step (c).

31. The process of claim 30 wherein the contaminated porous substrate is a material selected from the group consisting of concrete and asphalt.

32. The process of claim 30 wherein said contaminated porous substrate is brick.

33. The process of claim 30 wherein said contaminated porous substrate is block.

* * * * *